United States Patent

[11] 3,538,904

[72] Inventor Gerald E. Baker
 Mansfield, Ohio
[21] Appl. No. 759,995
[22] Filed Sept. 16, 1968
[45] Patented Nov. 10, 1970
[73] Assignee Westinghouse Electric Corporation
 Pittsburgh, Pennsylvania
 a corporation of Pennsylvania

[54] COMBINATION FOOD PREPARATION DEVICE
 6 Claims, 4 Drawing Figs.
[52] U.S. Cl. ............................................... 126/21,
 219/400
[51] Int. Cl. ..................................................... F24c 15/32
[50] Field of Search ............................................ 126/19, 21,
 21A, 273, 273A; 219/393, 400

[56] References Cited
UNITED STATES PATENTS
| 2,490,076 | 12/1949 | Maxson | 126/21AUX |
| 2,898,437 | 8/1959 | McFarland | 126/21AX |

FOREIGN PATENTS
| 550,920 | 2/1943 | Great Britain | 219/400 |

Primary Examiner—Charles J. Myhre
Attorney—F. H. Henson, Ralph T. French and B. B. Sklar, Jr.

ABSTRACT: A combination food warming and thawing cabinet characterized by the employment of a fan, heater structure and control therefor which control provides for selectively circulating either heated air or air at substantially ambient or room temperature. Structures provided for controlling the flow path as well as the velocity of the air such that nonheated air at high velocities can be utilized for the thawing mode of operation and heated air circulated at relatively lower velocities can be utilized for the food warming mode of operation.

Patented Nov. 10, 1970

WITNESSES
Theodore F. Wrobel
James F. Young

INVENTOR
Gerald E. Baker
BY
AGENT

COMBINATION FOOD PREPARATION DEVICE

BACKGROUND OF THE INVENTION

This invention relates, in general, to domestic appliances and, more particularly, to food preparation apparatus.

In the process of preparing a meal, it is often necessary to employ various aids to optimize the quality of the meal, particularly, from the standpoint of appearance and taste. Such aids comprise warming ovens or cabinets having heated air circulated therethrough. Heretofore such ovens have been suitable for certain foods while being totally unsatisfactory for others. For example, frozen foods require exposure to low temperature and high air velocities, consequently, when they are exposed to very high temperatures, they become discolored and are subject to bacteria growth. Nonfrozen foods can withstand higher temperatures but become dried out when exposed directly to air flow, particularly, when the air flow is at a relatively high velocity. It will be appreciated from the foregoing that an oven suitable for the former would not be suitable for the latter.

Accordingly, the general object of this invention is to provide a new and improved food preparation device which is capable of a plurality of operational modes.

It is a more particular object of this invention to provide, in a food preparation device, structure for effecting flow of either heated or substantially nonheated air therethrough.

Another object of this invention is to provide, in a food preparation device, means for effecting the flow of heated or nonheated air therethrough and to further provide means for varying the flow path through the device as well as the velocity of the air flowing therethrough.

BRIEF SUMMARY OF THE INVENTION

Briefly, the above-cited objects are accomplished by the provision of a single cabinet having a plurality of paths along which air may flow. A blower is provided for circulating air along one or the other of the above-mentioned flow paths, depending on the preselected positioning of a damper structure serving to prevent air flow along an undesired flow path.

A heater element and control are provided for selectively warming the circulated air when a food warming operation is desired. The control, in a second operative position thereof, is capable of energizing the blower while the heater is deenergized, to effect flow of nonheated air when a thawing operation is desired.

In either mode of operation, the air passes into a baffle provided with the above-mentioned damper. The damper has a plurality of slots which can be aligned with similar slots in the lower half of the inner panel of the cabinet to allow air flow from the baffle into the interior of the cabinet, which air flows across the cabinet and exits through similar openings in the lower half of an oppositely disposed inner side panel. Foodstuffs to be thawed are supported within the cabinet by a trivet rack such that the air flows both above and below by virtue of the spaced relationship of the openings in the inner side panels.

The slots in the damper can be also misaligned by raising the damper to another operative position where air flow between the air panels and the outer cabinet wall, and through openings in the top half of the inner side panels. Some of the air flows directly back to the blower along a path beneath the bottom wall of the cabinet without passing through the oven. This is accomplished by providing communication between the space between the inner panel on the one side of the cabinet and a space between the bottom wall of the cabinet and a blower mounting shelf.

Further objects and advantages of the present invention will become more apparent when considered in view of the following detailed description and drawings forming a part hereof.

DETAILED DESCRIPTION OF THE PREFERRED EMBODIMENT OF THE INVENTION

Figure 1:
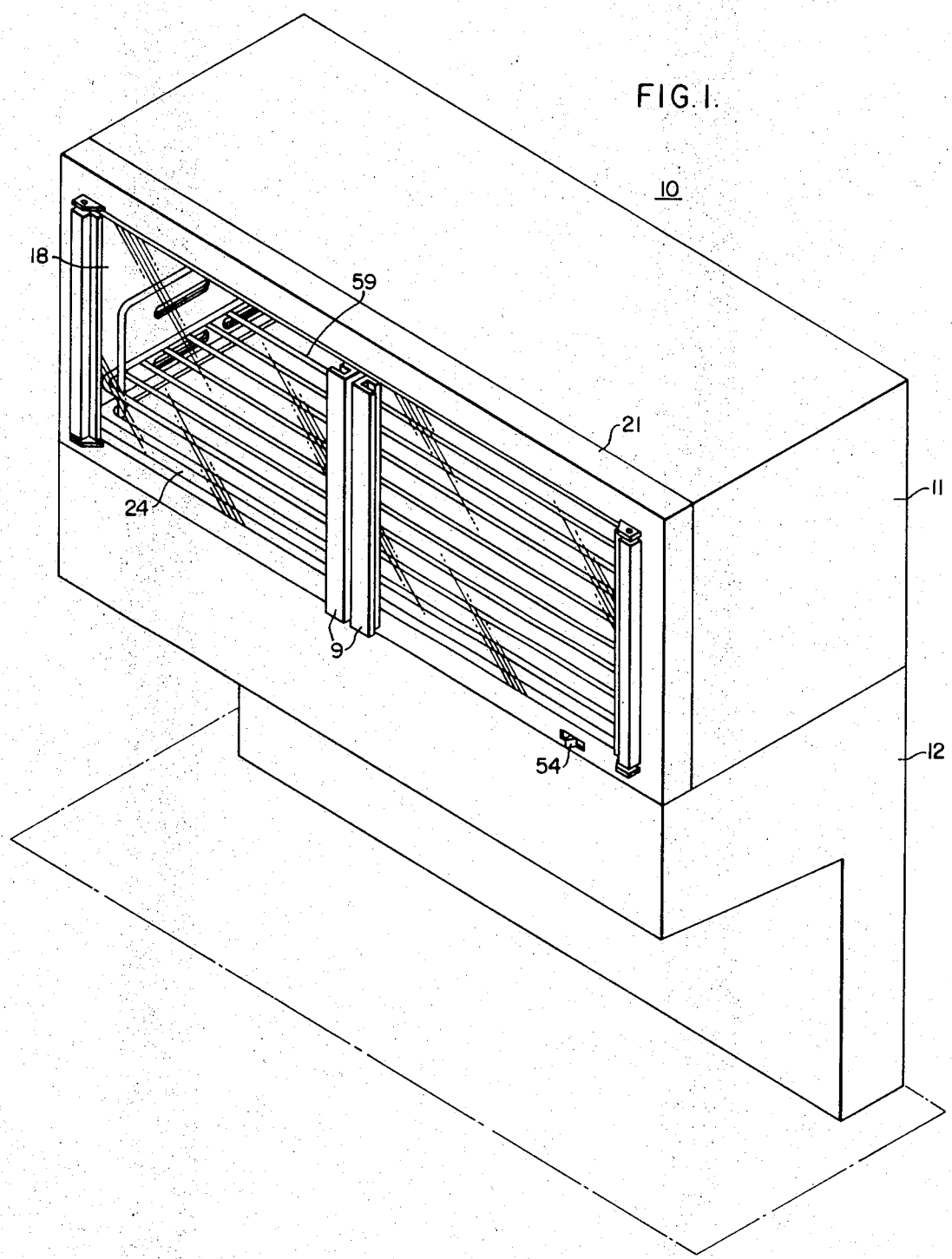
FIG. 1 is a perspective view of a combination food preparation cabinet and range canopy incorporating the invention.
Figure 3:
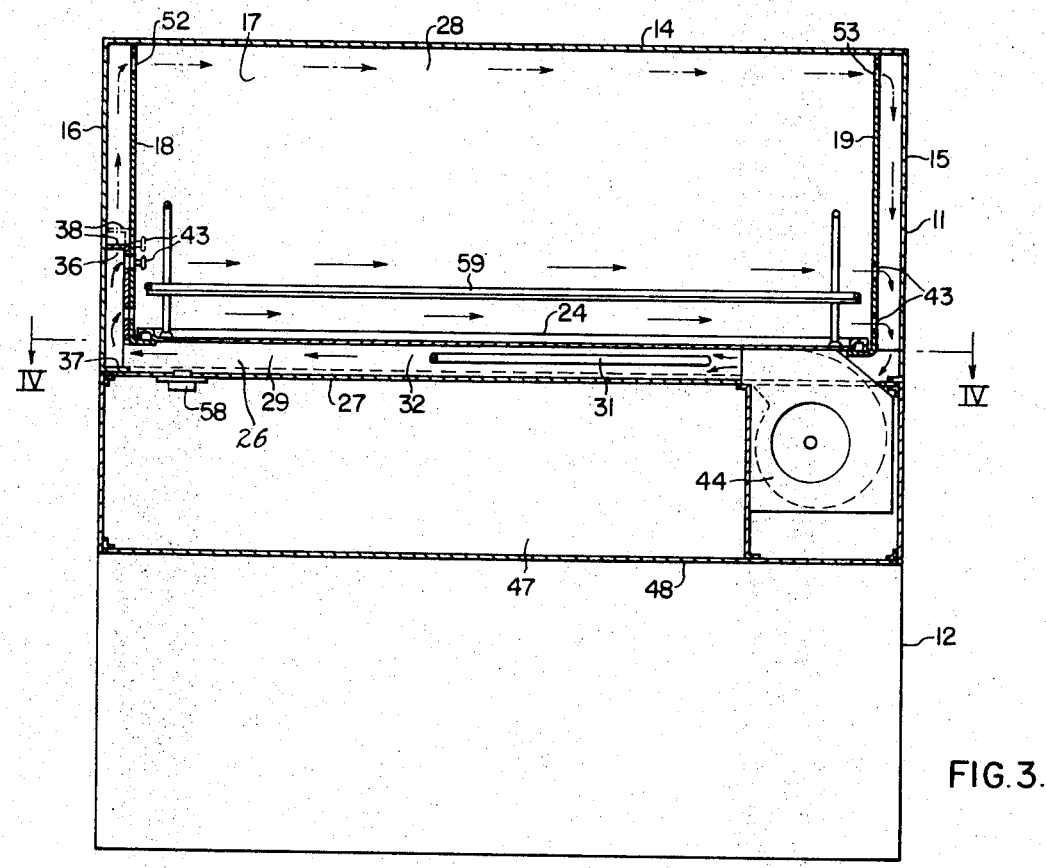
FIG. 3 is a front elevational view of the cabinet and canopy with the doors and trim member of the cabinets removed and with the front of the canopy removed.

Referring now to the drawings, especially FIG. 1, reference character 10 designates generally a food preparation appliance comprising cabinet structure 11 provided with pivotally mounted doors 9 and a range canopy 12. The cabinet comprises a wrapper type outer shell 13 having top, right side, left side and rear walls, 14, 15, 16 and 17, respectively. A pair of left and right inner side panels 18 and 19 are attached at one end thereof to the rear wall 17 and at the other end thereof to a front trim member 21 of the cabinet 10. As shown in FIG. 3, the panels are spaced from their adjacent side walls to permit circulation of air therebetween. The panels 18 and 19 are provided with flanges 22 and 23 at the lower edges thereof for supporting a bottom wall 24 of the cabinet structure 11. The bottom wall is supported intermediate the upper and lower edges of the side walls 16 and 17 but closer to the lower edges such that a space 26 is provided between the bottom wall 24 of the cabinet and a top wall 27 of the canopy 12. It will now be seen that the panels 18 and 19, top wall 14 and bottom wall 24 delineate the cavity 28 wherein foodstuffs can be placed while being supported by the bottom wall 24.

Figure 2:
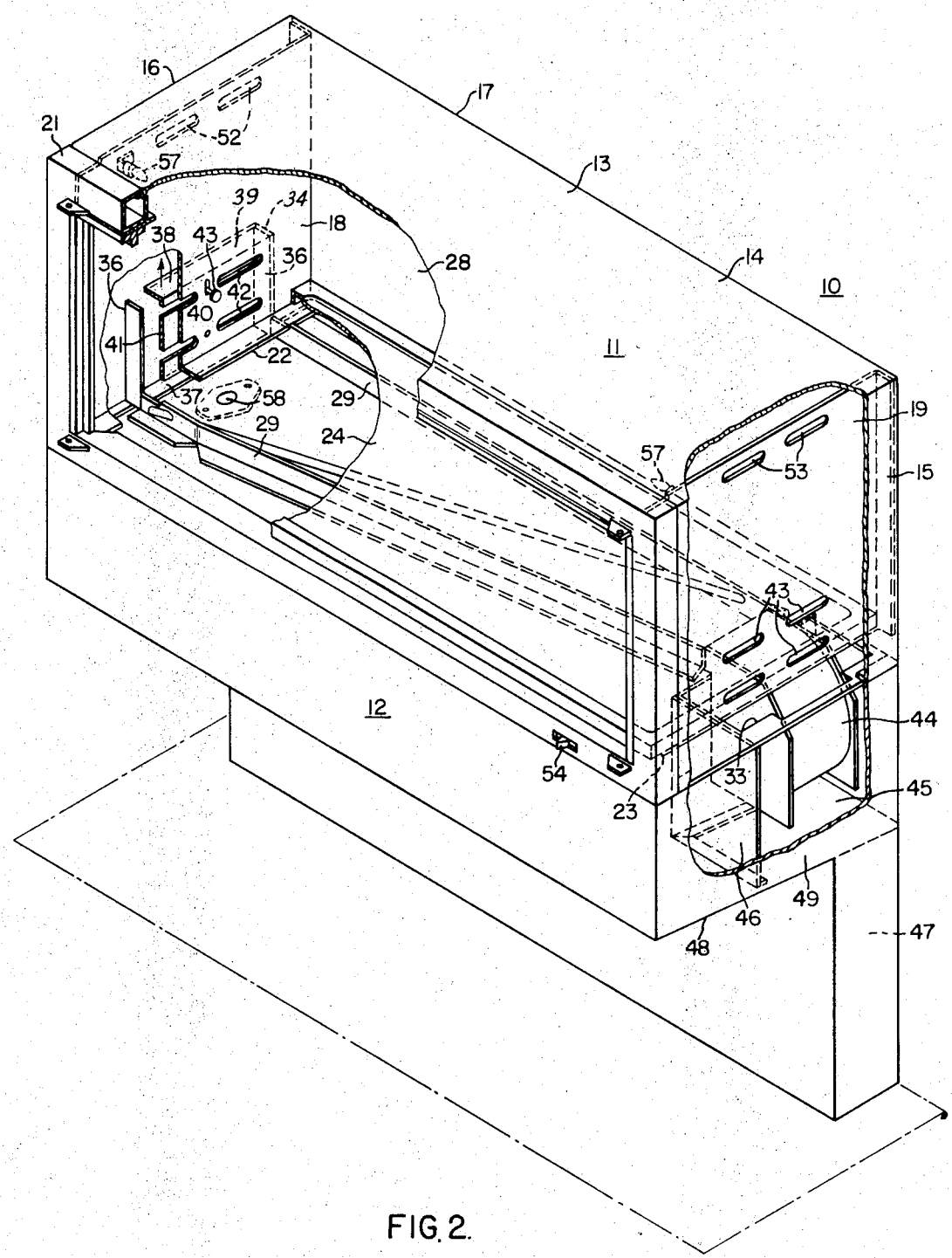
FIG. 2 is a perspective view of the device shown in FIG. 1, but with the cabinet door removed and with the bottom wall of the cabinet partially broken away.
Figure 4:
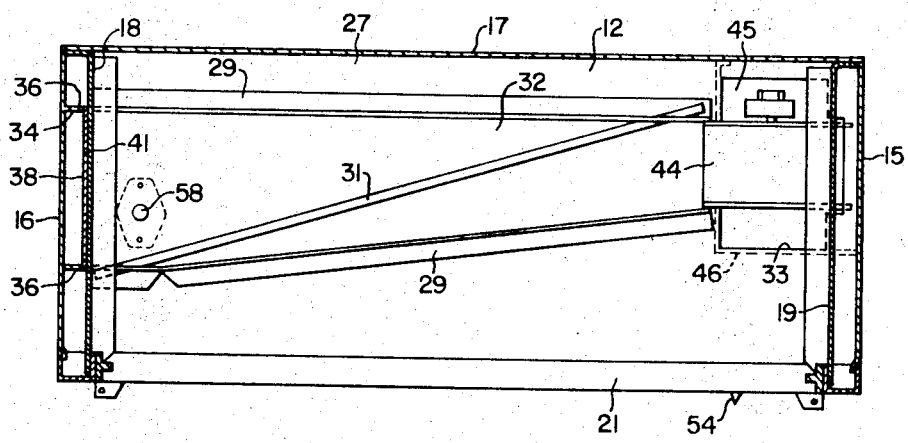
FIG. 4 is a cross-sectional view taken on the line IV-IV of FIG. 3.

Supported on the top wall 27 of the canopy 12, as viewed in FIG. 4, are a pair of angle-shaped baffles 29 which extend in a spaced apart relationship between opposed ends of the top wall 27. The baffles 29 serve a dual function in that they support a corox heater 31 rated at about 500 watts, and cooperate with the bottom wall 24 and top wall 27 to form an air channel 32 which extends between an opening 33 in the wall 27 and, as shown in FIG. 2, the lower portion of a deflector baffle 34 carried by the left side wall 16.

The baffle 34 disposed between side wall 16 and the inner panel 18 comprises a pair of upstanding walls 36, a lower wall 37 and an L-shaped damper plate 38, the foot portion 39 of which rests (in one operative position thereof) on the tops of the upstanding walls 36. The damper plate 38 is provided with four elongated slots 40 in a vertical wall 41 thereof which can be aligned with four similar slots 42 in the panel 18 to provide communication between the air channel 32 and the cavity 28 via the deflector baffle. The side panel 19 is provided with slots 43 similar to slots 42 for providing communication between the cavity 28 and the space between the right wall 15 and right panel 19, which space, in turn, communicates with the channel 32. The damper plate 38 can be moved to a second operative position from within the cavity 28 by means of a knob 43. In this position the slots 40 and 42 are misaligned.

A blower 44, supported subadjacent the opening 33 in the top wall 27, provides air circulation through the air channel 32 into the deflector baffle 34, to the cavity 28 through the aligned slots 40 and 42, through the slots 43 on the right side of the cavity and back into the channel 32 via an air intake chamber 45, housing the blower 44. An L-shaped member 46 cooperates with the top wall 27 of the canopy 12, a back wall 47, a bottom wall 48 thereof and a side wall 49 to form the chamber 45.

The damper plate 38 is capable of being raised to and supported in the second operative position by means of the knob 43 which extends into the cavity 28 through the side panel 18. A fastener (not shown) exerts a frictional force against the back side of the damper plate such that it remains in its raised position. Raising of the damper plate lifts the foot portion 39 from the upstanding walls 36 and simultaneously effects misalignment of the slots 40 and 42. The clearance between the foot portion and walls 36 allows air to flow into the space between the left side wall 16 and the left side panel 18. Approximately half of the air flows upwardly while the rest flows downwardly and between the bottom wall 24 of the cabinet in the top wall 27 of the canopy and returns to the blower 44 without passing through the cavity 28. That portion of the air flowing upwardly travels through a pair of elongated slots 52 in the top half of the side panel 18, into and across the cavity 28 and then through a pair of similarly shaped and disposed slots 53 in the right side panel 19, after which it returns to the blower 44.

A three position control switch 54, supported by a trim member, is connected by suitable wiring (not shown for sake of clarity) to the heater 31, blower 44, a plurality of interior lights 57 and a power cord (not shown) in such a manner that in a first position thereof the oven lights and blower are energized while in a second position thereof the heater 31 is energized along with the blower and interior lights. The third position of the switch 54 constitutes an "off" position. To control the operation of the heater 31 so as to warm the circulated air to approximately 150°F., a thermostat 58 is mounted in the top wall 27 of the canopy 12 in the area of the heater 31 and is connected to the circuit (not shown) for interruption thereof in response to temperature changes.

It should now be apparent that there has been provided a combination food preparation appliance capable of thawing frozen foods through actuation of the switch to energize a blower and interior lights and by adjusting a damper plate such that flow of substantially ambient air (only source of heat being that generated by the blower motor and the interior lights) is effected at high velocities. Alternatively, the lights, blower and a 500 watt heater may be energized through the three position switch while the damper plate is repositioned to change the air flow pattern and velocity. A trivet rack 59 serves to support foodstuffs within the cavity 28 such that during the thawing mode of operation air flows both above and below the foodstuffs where it can contact substantially all of the surfaces thereof.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim:
1. A combination oven for warming and thawing foods, said oven comprising:
   cabinet structure including a cavity to receive food;
   means forming a false wall space external to said cavity;
   a blower external of said cavity;
   means separating said false wall space into a first passage connected to receive air from said blower, and a second passage in communication with the inlet of said blower;
   selectively energizable heating means in said first passage;
   adjustable means at the outlet of said first passage for controlling the return path of air to said inlet of said blower, said adjustable means having a first position directing substantially all of the air from said first passage into said cavity, and a second position for directing a part of said air from said first passage into said cavity and the remainder into said second passage for direct return to said blower.
2. An oven according to claim 1 wherein:
   said cabinet includes a pair of spaced apart walls at each end of said cabinet;
   said first passage outlet and said adjustable means are located at one end of said cabinet; and
   the space between said walls at the other end of said cabinet is in communication with said blower inlet.
3. An oven according to claim 2 wherein: the inner ones of said spaced apart walls include apertures in both the lower and upper portions thereof.
4. An oven according to claim 3 wherein: said adjustable means in said first position directs all of said air through said lower apertures.
5. An oven according to claim 3 wherein: said adjustable means in said second position blocks flow through said lower apertures and directs all of the flow entering said cavity through said upper apertures.
6. An oven according to claim 3 wherein: said adjustable means comprises a damper plate having apertures arrayed in conformance with the array of said lower apertures and disposed for sliding movement relative thereto for controlling the registry of said apertures with each other and for thereby controlling the changing of said adjustable means between said first and second positions.